(12) United States Patent
Warmenhoven

(10) Patent No.: US 11,888,896 B2
(45) Date of Patent: *Jan. 30, 2024

(54) ENHANCING NETWORK SECURITY

(71) Applicant: UAB 360 IT, Vilnius (LT)

(72) Inventor: Adrianus Warmenhoven, Overijssel (NL)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,964

(22) Filed: Mar. 24, 2022

(65) Prior Publication Data
US 2023/0308482 A1   Sep. 28, 2023

Related U.S. Application Data

(63) Continuation of application No. 17/701,654, filed on Mar. 22, 2022, now Pat. No. 11,770,410.

(51) Int. Cl.
*H04L 9/00* (2022.01)
*H04L 9/40* (2022.01)
*H04L 9/08* (2006.01)

(52) U.S. Cl.
CPC ........ *H04L 63/1491* (2013.01); *H04L 9/0822* (2013.01); *H04L 9/0869* (2013.01); *H04L 9/0891* (2013.01); *H04L 63/0442* (2013.01); *H04L 2463/061* (2013.01)

(58) Field of Classification Search
CPC .................................................. H04L 63/1491
USPC ........................................................ 726/22
See application file for complete search history.

(56) References Cited

U.S. PATENT DOCUMENTS

| 5,351,298 | A | 9/1994 | Smith | |
|---|---|---|---|---|
| 6,240,513 | B1 * | 5/2001 | Friedman | H04L 63/0823 713/160 |
| 7,120,696 | B1 * | 10/2006 | Au | H04L 9/0891 713/400 |
| 9,489,354 | B1 | 11/2016 | Lee et al. | |
| 10,491,578 | B1 | 11/2019 | Hebert et al. | |
| 10,541,808 | B2 | 1/2020 | Samid | |
| 10,574,578 | B2 | 2/2020 | Lai | |
| 10,574,698 | B1 * | 2/2020 | Sharifi Mehr | H04L 63/1491 |
| 11,470,061 | B2 | 10/2022 | Satpathy et al. | |
| 2009/0261981 | A1 | 10/2009 | Jones et al. | |
| 2011/0317835 | A1 | 12/2011 | Laird et al. | |
| 2015/0242086 | A1 * | 8/2015 | Mindlin | G06F 3/0481 715/769 |
| 2016/0294793 | A1 | 10/2016 | Larson et al. | |

(Continued)

*Primary Examiner* — Christopher J Brown
(74) *Attorney, Agent, or Firm* — The Pattani Law Group

(57) ABSTRACT

A method including configuring, by an infrastructure device, a transmitting device to determine an encryption key that is determined based at least in part on seed information associated with the transmitting device and a receiving device, and to encrypt one or more content messages to be transmitted during a first time interval by utilizing the encryption key; and configuring, by the infrastructure device, the receiving device to determine a decryption key that is determined based at least in part on the seed information associated with the transmitting device and the receiving device, and to decrypt one or more encrypted content messages received during the first time interval by utilizing the decryption key. Various other aspects are contemplated.

20 Claims, 7 Drawing Sheets

(56) References Cited

U.S. PATENT DOCUMENTS

2016/0337120 A1    11/2016  Samid
2019/0268146 A1*   8/2019  Samid .................. H04L 9/0852
2019/0280865 A1    9/2019  Tobias et al.

* cited by examiner

ENHANCING NETWORK SECURITY

CROSS REFERENCE

This application is a continuation of U.S. Non-Provisional patent application Ser. No. 17/701,654, filed on Mar. 22, 2022, and titled "Enhancing Network Security," the entire contents of which are incorporated herein by reference.

FIELD OF DISCLOSURE

Aspects of the present disclosure generally relate to cyber security, and more particularly to enhancing network security to mitigate the risks associated with cybercrimes.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including determining, by a transmitting device in communication with a receiving device, encrypted decoy messages based at least in part on encrypting decoy data utilizing an encryption key; determining, by the transmitting device, one or more encrypted content messages based at least in part on encrypting content data utilizing a cryptographic key, different from the encryption key; and transmitting, by the transmitting device to the receiving device, the one or more encrypted content messages among the encrypted decoy messages.

In another aspect, the present disclosure contemplates a transmitting device including a memory and a processor communicatively coupled to the memory, the memory and the processor being configured to: determine, while in communication with a receiving device, encrypted decoy messages based at least in part on encrypting decoy data utilizing an encryption key; determine one or more encrypted content messages based at least in part on encrypting content data utilizing a cryptographic key, different from the encryption key; and transmit, to the receiving device, the one or more encrypted content messages among the encrypted decoy messages.

In another aspect, the present disclosure contemplates a non-transitory computer readable medium storing instructions, which when executed by a processor, cause the processor to: determine, while in communication with a receiving device, encrypted decoy messages based at least in part on encrypting decoy data utilizing an encryption key; determine one or more encrypted content messages based at least in part on encrypting content data utilizing a cryptographic key, different from the encryption key; and transmit, to the receiving device, the one or more encrypted content messages among the encrypted decoy messages.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
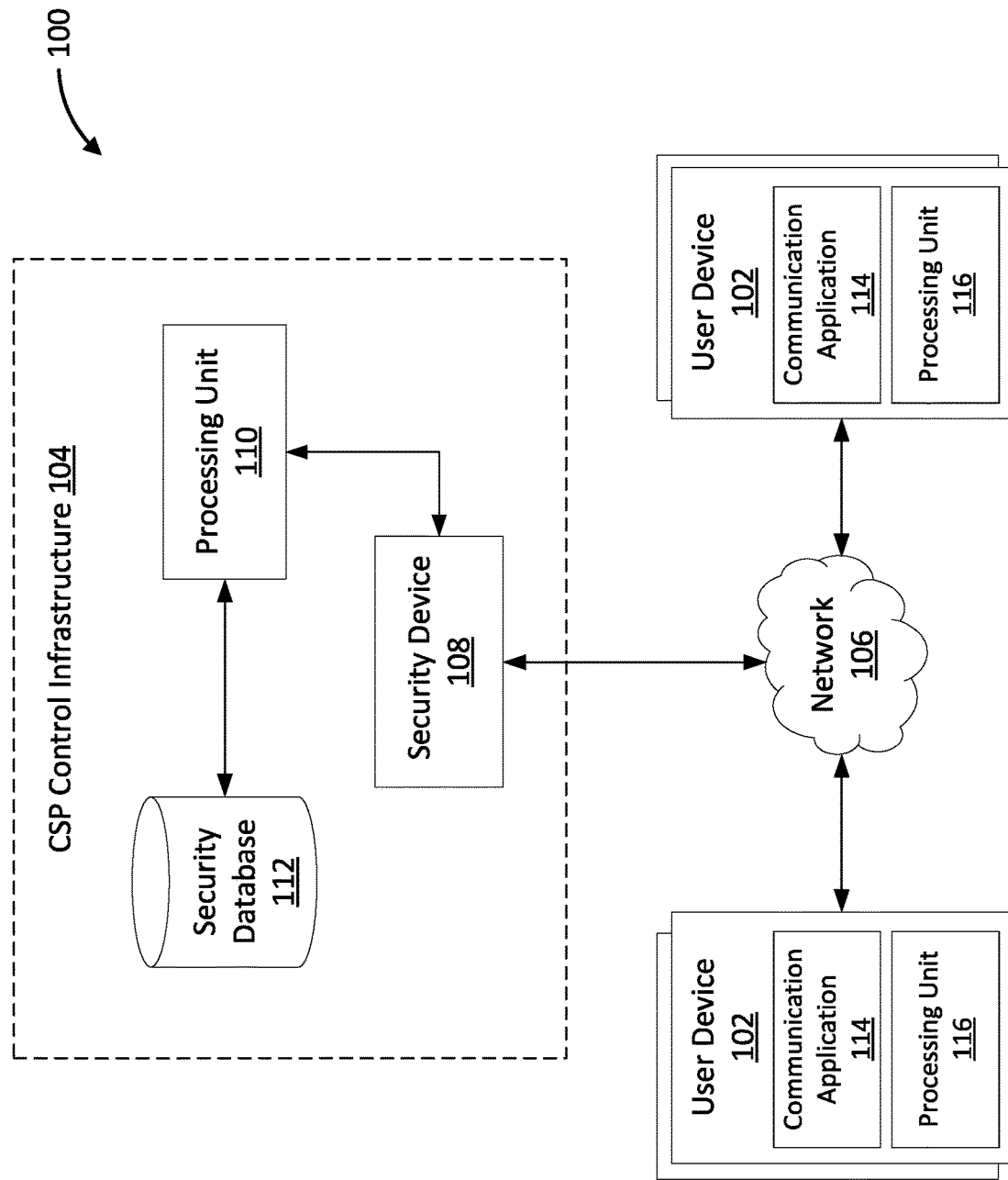

FIG. 1 is an illustration of an example system associated with enhancing network security, according to various aspects of the present disclosure.

Figure 2:
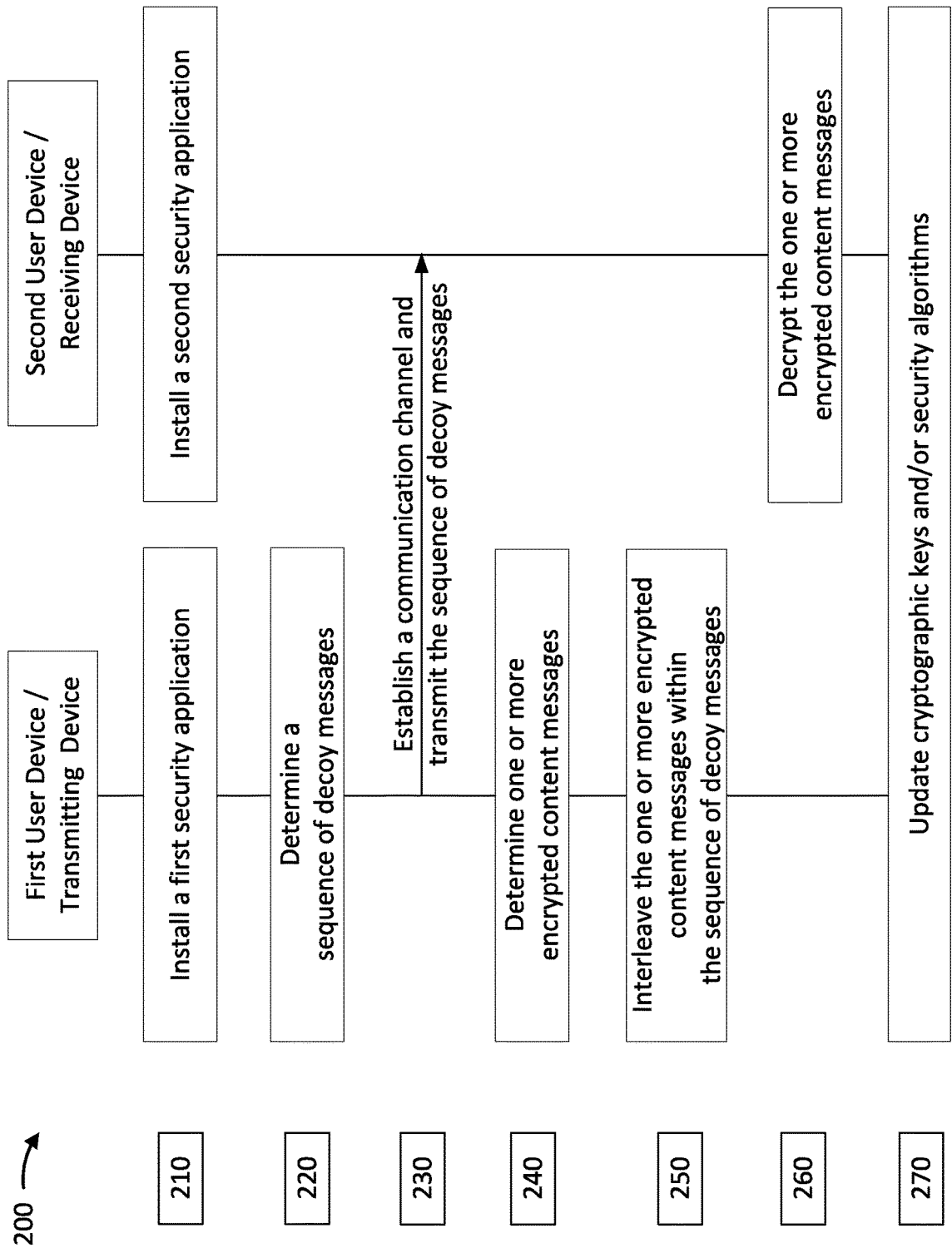

FIG. 2 is an illustration of an example flow associated with enhancing network security, according to various aspects of the present disclosure.

Figure 3:
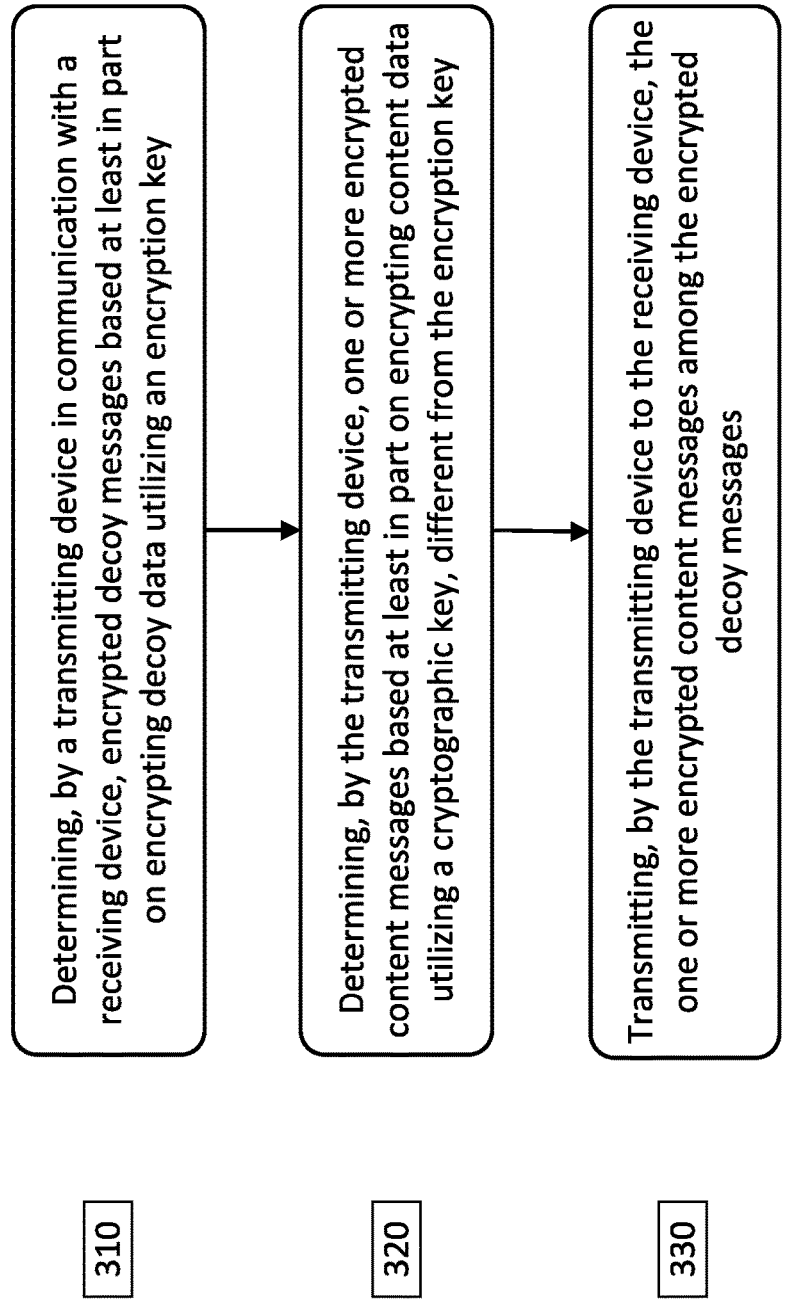

FIG. 3 is an illustration of an example process associated with enhancing network security, according to various aspects of the present disclosure.

Figure 4:
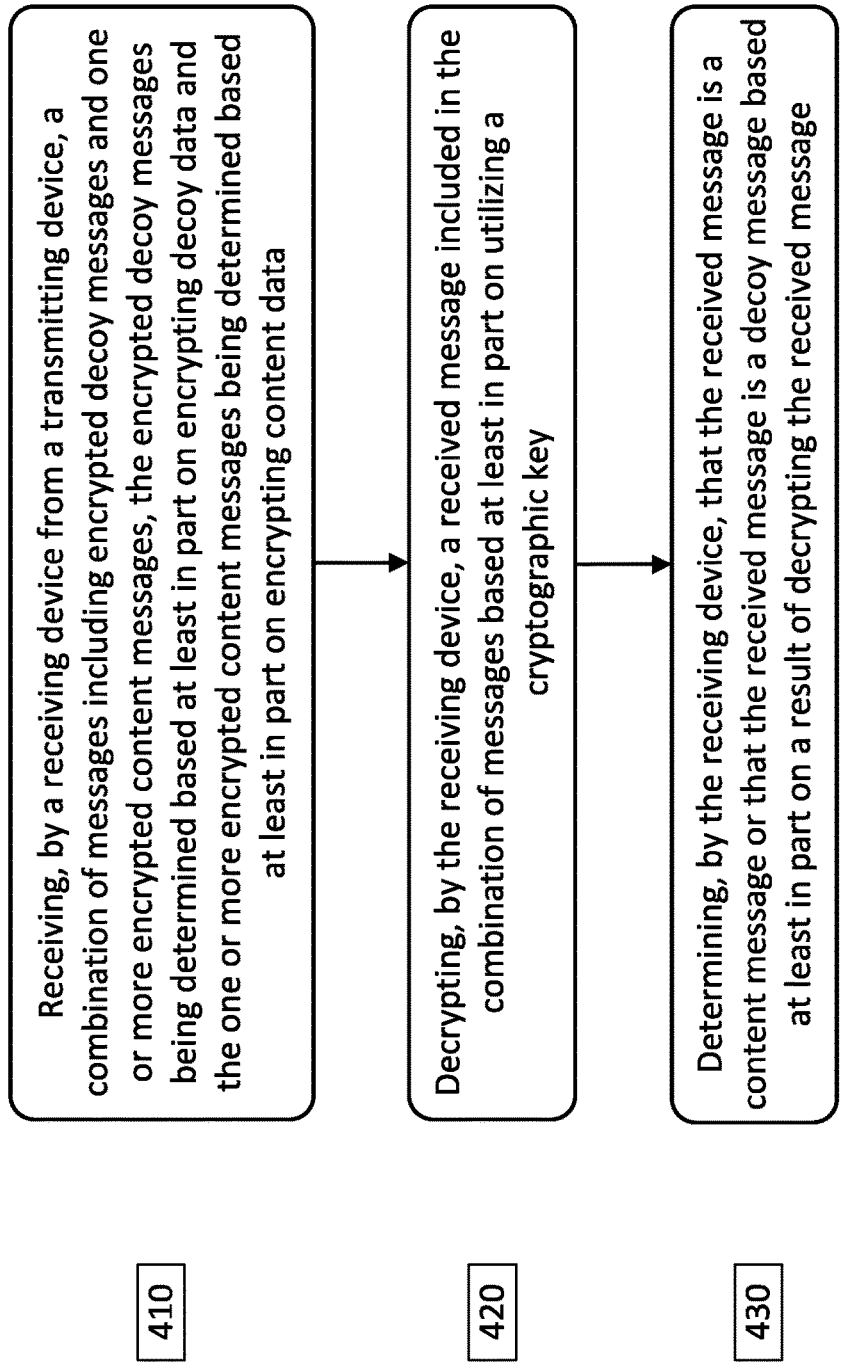

FIG. 4 is an illustration of an example process associated with enhancing network security, according to various aspects of the present disclosure.

Figure 5:
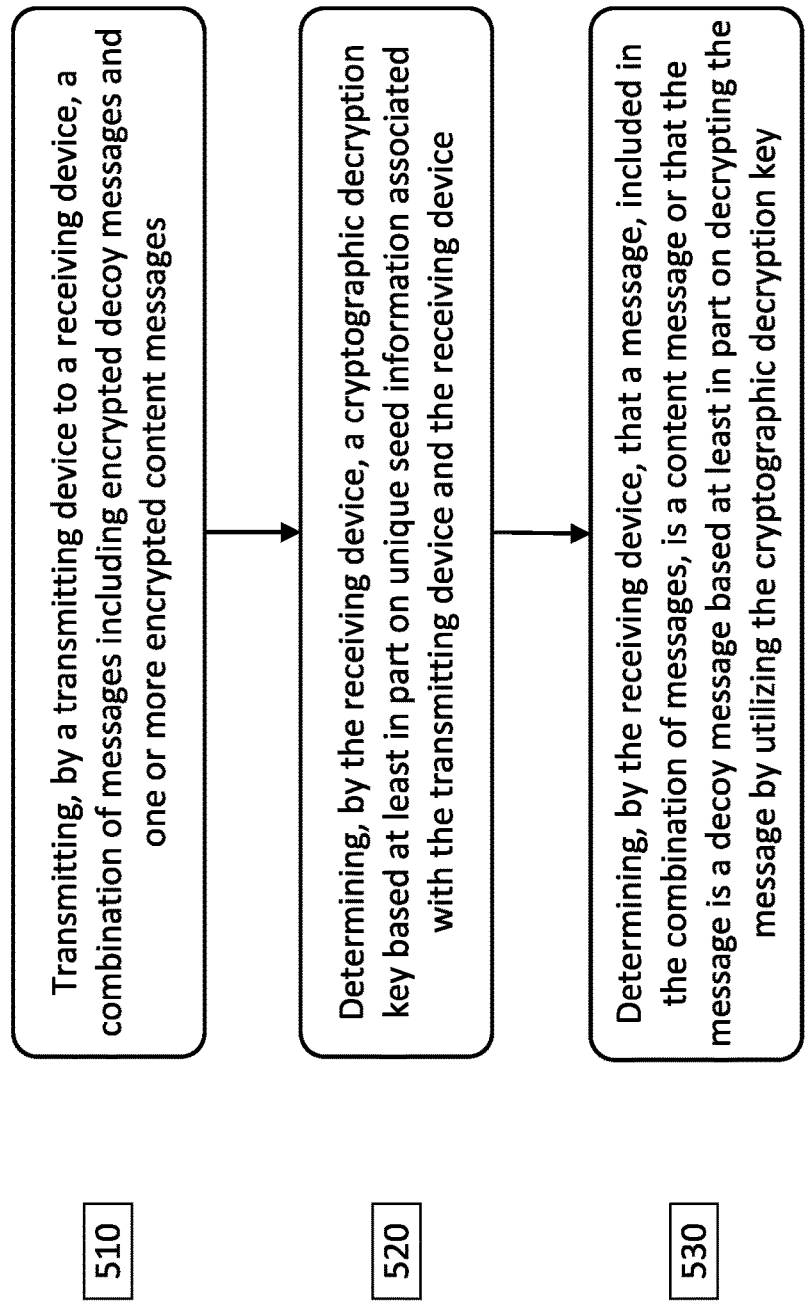

FIG. 5 is an illustration of an example process associated with enhancing network security, according to various aspects of the present disclosure.

Figure 6:
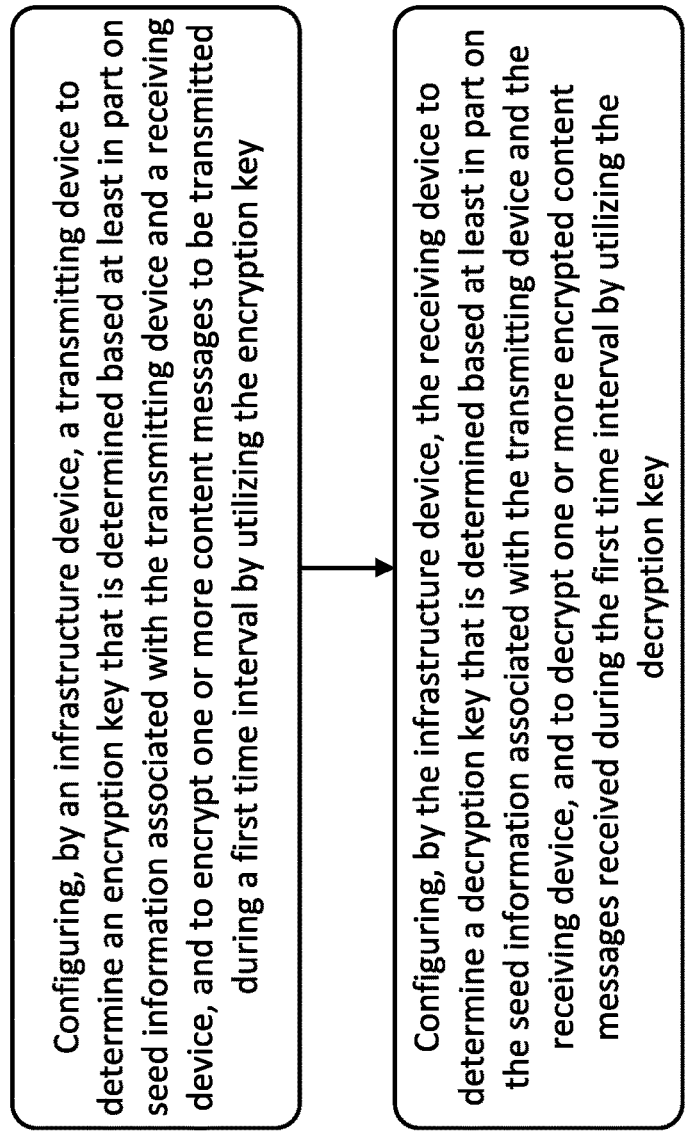

FIG. 6 is an illustration of an example process associated with enhancing network security, according to various aspects of the present disclosure.

Figure 7:
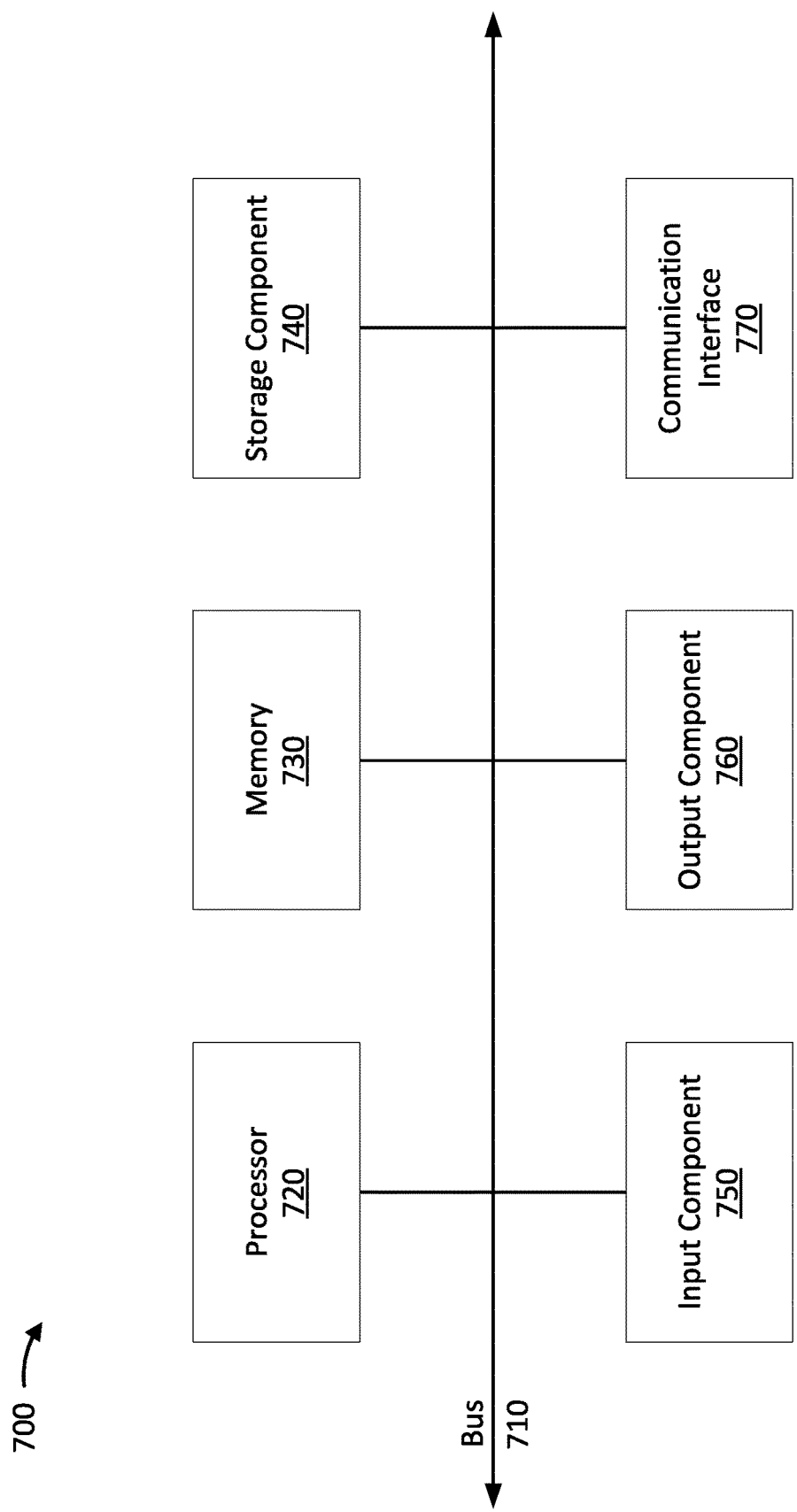

FIG. 7 is an illustration of example devices associated with enhancing network security, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with enhancing network security, according to various aspects of the present disclosure. Example 100 shows an architectural depiction of included components. In some aspects, the components may include one or more user devices 102 in communication with a cyber security service provider (CSP) control infrastructure 104 for purposes of obtaining cyber security services. The one or more user devices 102 and the CSP control infrastructure 104 may communicate over a network 106. The CSP control infrastructure 104 may include a security device 108, a processing unit 110, and a security database 112. The CSP control infrastructure 104 may be owned and operated by a cyber security service provider. The security device 108 may be configured to communicate with the one or more user devices 102 to and may be communicatively coupled to the processing unit 110. Additionally, the processing unit 110 may be communicatively coupled to the security database 112, which may be capable of storing data associated with providing the cyber security services.

A user device 102 may include a security application 114 (e.g., communication application) and a processing unit 116. The user device 102 may receive the security application 114 from the security device 108 associated with the CSP control infrastructure 104. In an example, a first user device may communicate with the security device 108 to receive a first security application 114 and a second user device may communicate with the security device 108 to receive a second security application 114. In some aspects, the security device 108 may configure the security applications 114 to enhance network security, as discussed below in further detail. The first user device 102 may utilize the first security application 114 to communicate (e.g., transmit and/or receive) content data over the network 106 with the second security application 114 included in the second user device 102.

The one or more user devices 102 may be physical computing devices capable of hosting applications (e.g., security applications 114, third-party applications, etc.) and of connecting to the network 106. The one or more user devices 102 may include, for example, a laptop, a mobile phone, a tablet computer, a desktop computer, a smart device, a router, or the like. In some aspects, the one or more user devices 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. In some aspects, the one or more user devices 102 may include a server computer.

The network 106 may be any wired or wireless digital telecommunication network that permits several nodes to share and access resources. In some aspects, the network 106 may include a combination of one or more of, for example, a local-area network (LAN), a wide-area network (WAN), a campus-area network (CAN), a metropolitan-area network (MAN), a home-area network (HAN), Internet, Intranet, Extranet, and Internetwork.

The processing unit 110 may be a logical unit including a logical component configured to perform complex operations associated with computing, for example, numerical weights related to various factors associated with providing the cyber security services. The processing unit 110 included in the CSP control infrastructure 104 may be configured to configure the security device 108 to provide the cyber security services to the one or more user devices 102.

The CSP control infrastructure 104 may include a combination of hardware and software components that enable provision of cyber security services to the one or more user devices 102. The CSP control infrastructure 104 may interface with (the security application on) the one or more user devices 102 via an application programming interface (API) (not shown), which may include one or more endpoints to a defined request-response message system. In some aspects, the API may be configured to receive, via the network 106, a connection request from the one or more user devices 102 to establish a connection with the CSP control infrastructure 104 for purposes of obtaining the cyber security services. The connection request may include a request to obtain and install security applications 114 and/or to receive the cyber security services.

The API may further be configured to handle the connection request(s) by mediating the authentication request. For instance, the API may receive from the user device 102 credentials including, for example, a unique combination of a user ID and password for purposes of authenticating the user device 102. In another example, the credentials may include a unique validation code known to an authentic user (e.g., a device authorized to receive the cyber security services). The API may provide the received credentials to the processing unit 110 for verification. The processing unit 110 may communicate with the security database 112 to authenticate the user device 102.

The security database 112 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The cyber security service provider may add or delete such valid unique combinations of user IDs and passwords from the structured repository at any time. Based at least in part on receiving the credentials from the API, the processing unit 110 may verify the received credentials by matching the received credentials with the valid credentials stored in the structured repository. In some aspects, the security database 112 and the processing unit 110 may authenticate the user device 102 when the received credentials match at least one of the valid credentials. In this case, the cyber security service provider may provide better security services to the user device 102. When the received credentials fail to match at least one of the valid credentials, the security database 112 and the processing unit 110 may fail to authenticate the user device 102. In this case, the cyber security service provider may decline to provide cyber security services to the user device 102. Additionally, as discussed below in further detail, the security database 112 may store data associated with providing the cyber security services.

When the user device 102 is authenticated, the user device 102 may initiate a connection with the CSP control infrastructure 104 for obtaining the cyber security services. The processing unit 110 may utilize the security device 108 to transmit information associated with the cyber security services to the user device 102.

One or more components (e.g., security device 108, processing unit 110, and/or security database 112, security application 114, processing unit 116) included in the CSP control infrastructure 104 and/or included in the user device 102, as shown in FIG. 1, may further be associated with a controller/processor, a memory, a communication interface, or a combination thereof (e.g., FIG. 7). For instance, the one or more components may include or may be included in a controller/processor, a memory, or a combination thereof. In some aspects, the one or more components included in the CSP control infrastructure 104 may be separate and distinct from each other. Alternatively, in some aspects, the one or more of the components included in the CSP control infrastructure 104 may be combined with one or more of the other components. In some aspects, the one or more of the components included in the CSP control infrastructure 104 and/or the user device 102 may be local with respect to each other. Alternatively, in some aspects, one or more of the components included in the CSP control infrastructure 104 and/or the user device 102 may be located remotely with respect to one or more of other components included in the CSP control infrastructure 104 and/or the user device 102. Additionally, or alternatively, one or more components of the components included in the CSP control infrastructure 104 and/or the user device 102 may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

User devices may rely on a network to communicate (e.g., transmit and/or receive) content data with each other. Such content data may include private information and/or sensitive data associated with the user device. The communication of such content data may be susceptible to a man-in-the-middle attack by a malicious party. In an example, the malicious party may intercept the content data communicated between the user devices and may gain unauthorized access to the private information and/or sensitive data. Even when the communicated content data is encrypted, the malicious party may apply sophisticated decryption techniques utilizing highly-developed computers to rapidly decrypt the encrypted data. In an example, sophisticated decryption techniques utilizing highly-developed computers may enable the malicious party to simultaneously apply a plurality of decryption keys and/or decryption algorithms to rapidly decrypt the encrypted data.

In some cases, the malicious party may alter the intercepted data. In an example, the malicious party may intercept content data communicated between the user devices. Further, the malicious party may alter the intercepted content data by introducing malware therein. When such altered content data is received by the one or more user devices, the included malware may enable the malicious party to connect with and/or gain unauthorized access to the user devices.

Based at least in part on connecting with and/or gaining unauthorized access, the malicious party may install the malware on one or more user devices. The malware may be designed to disrupt and/or damage operation of the one or more user devices. In an example, the malware may embed itself within an operating system of a user device and may execute an unauthorized transmission of private information stored in a memory associated with the one or more user devices. In another example, the malware may execute an unauthorized deletion of data stored in the memory. The malware may also cause other hindrances by adversely affecting the operating system such that the operating system may run slower and/or associated circuitry may emit excessive heat and/or noise, thereby causing damage to the user device.

In such cases, the one or more user devices may expend various user device resources (e.g., processing resources, memory resources, power consumption resources, battery life, or the like) in efforts to mitigate effects of the private information becoming compromised and the hindrances caused by the system malware. Further, the network may expend network resources (e.g., management resources, bandwidth resources, memory usage resources, processing resources, or the like) in efforts to mitigate effects of the man-in-the-middle attack.

Various aspects of systems and techniques discussed in the present disclosure enable enhancing network security. In some aspects, as shown in FIG. 1, a CSP control infrastructure may configure a security device to enhance the network security by configuring and providing security applications, as discussed herein. The security device may communicate with user devices to provide cyber security services, which may include providing respective security applications configured for communication of data. The respective security applications may enable the user devices to determine cryptographic keys and/or security algorithms for encrypting and/or decrypting content messages that include the content data to be communicated. Further, the respective security applications may enable the user device to determine decoy messages and to encrypt decoy messages using random encryption keys and/or random encryption algorithms. The respective applications may interleave the encrypted content messages in a sequence of encrypted decoy messages. Additionally, the respective applications may be configured to implement a system of periodically determining new cryptographic keys and/or security algorithms for encrypting and/or decrypting the content messages. In this way, by interleaving encrypted content messages among encrypted decoy messages and periodically determining new cryptographic keys and/or security algorithms, the respective applications may assist in avoiding interception and/or decryption of the content messages by a malicious party, even when the malicious party may utilize sophisticated decryption techniques utilizing highly-developed computers. As a result, the respective applications may assist in avoiding the malicious party connecting with and/or gaining unauthorized access to the user devices. Consequently, the respective applications may assist in avoiding disruption and/or damage to operation of the user devices and other hindrances. Additionally, the respective applications may enable efficient utilization of user device resources (e.g., processing resources, memory resources, power consumption resources, battery life, or the like) and network resources (e.g., management resources, bandwidth resources, memory usage resources, processing resources, or the like) for suitable tasks.

In some aspects, a processor (e.g., processing unit 116, processor 720, etc.) may determine, while in communication with a receiving device, encrypted decoy messages based at least in part on encrypting decoy data utilizing an encryption key; determine one or more encrypted content messages based at least in part on encrypting content data utilizing a cryptographic key, different from the encryption key; and transmit, to the receiving device, the one or more encrypted content messages among the encrypted decoy messages.

FIG. 2 is an illustration of an example flow 200 associated with enhancing network security, according to various aspects of the present disclosure. The example flow 200 may include a first user device in communication with a second user device (collectively referred to as "the user devices"). In some aspects, the user devices may be similar to a user device 102, discussed above with respect to FIG. 1. In some aspects, the user devices may communicate content data including, for example, private information and/or sensitive data with each other. The user devices may also be in communication with a CSP control infrastructure 104 (e.g., FIG. 1). The user devices may communicate with each other and with the CSP control infrastructure 104 over a network (e.g., network 106). As discussed herein, the CSP control infrastructure 104 may enable the user devices to obtain cyber security services associated with enhancing network security to enable secure communication of content data between the user devices. Although only two user devices are shown in FIG. 2, the present disclosure contemplates inclusion of any number of user devices operating in a similar and/or analogous manner, as discussed herein.

In some aspects, the user devices may obtain cyber security services from the CSP control infrastructure 104. Providing the cyber security services may include the CSP control infrastructure 104 utilizing the security device 108 to configure and provide respective security applications to be utilized by the user devices for communication of the data. The security device 108 may configure the respective security applications (e.g., communication applications 114) to determine synchronized cryptographic keys and/or security algorithms for encrypting and/or decrypting content messages to communicate the content data with each other, as discussed herein.

To obtain the cyber security services, the user devices may register one or more accounts with the CSP control infrastructure 104. During registration, the user devices may provide respective registration information such as, for example, respective identities of owners of the user devices, respective phone numbers associated with the user devices, respective email addresses associated with the user devices, or a combination thereof. Further, during the registration, the user devices may transmit one or more messages to the security device 108 indicating that the first user device and the second user device are to communicate with each other. In an example, the first user device (or the second user device) may transmit a message including identification information to identify the second user device (or the first user device), and thereby indicate that the first user device and the second user device are to communicate with each other. The identification information may include, for example, at least a portion of the registration information associated with the second user device (or the first user device).

Based at least in part on receiving the message, the security device 108 may determine that the first user device and the second user device are to communicate with each other. Accordingly, the security device 108 may configure a first security application for the first user device and a synchronized second security application for the second user device. In some aspects, the security device 108 may configure the first security application and the second security application (collectively referred to as the security applications) to be synchronized with each other to enable the security applications to communicate with each other.

In an example, the security device 108 may configure the security applications to include unique seed information for determination of synchronized symmetric cryptographic keys to be utilized for encryption and/or decryption of content messages that include the content data to be communicated between the user devices. For enhanced security, the security device 108 may determine the unique seed information based at least in part on, for example, any combination of the respective registration information and/or identification information associated with the user devices. Further, the security device 108 may configure the security applications to determine synchronized security algorithms (e.g., encryption-decryption algorithms) for encrypting and/or decrypting the content messages. In some aspects, the security applications may be configured to periodically determine new symmetric cryptographic keys and/or security algorithms based at least in part on utilizing the unique seed information. In an example, for utilization during a first interval of time, the security applications may determine and utilize a first symmetric cryptographic key and/or a first security algorithm to encrypt and/or decrypt the content messages communicated during the first interval of time. At an expiration of the first of the interval of time, a second interval of time may begin. For utilization during the second interval of time, the security applications may determine and utilize a second symmetric cryptographic key and/or a second security algorithm to encrypt and/or decrypt the content messages communicated during the second interval of time, and so on.

In some aspects, the intervals of time may be coordinated with a reference time system (e.g., UNIX time system). In some aspects, a duration associated with the first interval of time may be the same as a duration associated with the second interval of time. In some aspects, the duration associated with the first interval of time may be different with respect to the duration associated with the second interval of time. Durations of time associated with the intervals of time may include any duration of time (e.g., 30 seconds, 45 seconds, 60 seconds, 120 seconds, 300 seconds, one hour, one day, one week, one month, etc.). In some aspects, the durations of time may be determined based at least in part on a level of sensitivity associated with the content data included in a content message. In an example, when the level of sensitivity satisfies a sensitivity threshold (e.g., the level of sensitivity is equal to or greater than the sensitivity threshold), the respective applications may determine a shorter duration of time compared to a duration of time determined when the level of sensitivity fails to satisfy the sensitivity threshold (e.g., the level of sensitivity is less than the sensitivity threshold).

Further, the security device may configure the security applications to access a repository (e.g., security database 112) including a set of random encryption keys and/or random encryption algorithms to be utilized for encryption of decoy messages that include decoy information, which is separate from the content data to be communicated between the user devices. The repository may also include decoy data in the form of, for example, text data, graphics data, audio data, video data, or any combination thereof, which the security applications may utilize to determine the decoy information.

Based at least in part on configuring the security applications, the security device 108 may enable the user devices to receive and install the security applications. For instance, as shown by reference numeral 210, the first user device may install the first security application and the second user device may install the second security application.

In some aspects, during the first interval of time, the first user device may transmit a content message to the second user device. Prior to transmission of the content message, as shown by reference numeral 220, the first user device may utilize the first security application to determine a sequence of decoy messages. In some aspects, the first security application may determine the plurality of decoy messages by determining a type associated with the content message to be transmitted to the second user device. For instance, the first security application may be configured to determine whether the content message is to include, for example, text data, graphics data, audio data, video data, or any combination thereof. Based at least in part on determining the type associated with the content message, the first security application may retrieve corresponding decoy data from the repository. In an example, when the first security application determines that the content message is to include, for example, text data and graphics data, the first security application may retrieve decoy text data and decoy graphics data from the repository. In another example, when the first security application determines that the content message is to include, for example, audio data, the first security application may retrieve decoy audio data from the repository. The first security application may determine the decoy information to be included in the plurality of decoy messages based at least in part on the retrieved decoy data. In this way, the decoy data may resemble the content data to be included in the content message, thereby making it more difficult for a malicious party to distinguish between a decoy message and a content message.

Further, the first security application may utilize the one or more random encryption keys and/or the one or more random encryption algorithms to encrypt the plurality of decoy messages. In an example, the first security application may employ a first scheme including utilizing a first random encryption key and/or a first random encryption algorithm to encrypt a first decoy message, a second random encryption key and/or a second random encryption algorithm to encrypt a second decoy message, and so on. In another example, the first security application may employ a second scheme including utilizing the first random encryption key and/or the first random encryption algorithm to encrypt a first random number of decoy messages, the second random encryption key and/or the second random encryption algorithm to encrypt a second random number of decoy messages, and so on. In some aspects, the first security application may employ the first scheme during the first interval of time, the second scheme during the second interval of time, and so on. In some aspects, the first security application may randomly select the scheme to be employed during a given interval of time. Additionally, the first security application may determine a sequence of the decoy messages including a plurality of encrypted decoy messages arranged in a series.

Based at least in part on determining the sequence of decoy messages, as shown by reference numeral 230, the first security application may communicate with the second security application to establish a communication channel. In some aspects, the communication channel may include a one-way transmission channel for transmitting messages from the first security application to the second security application. Further, as shown by reference numeral 230, the first security application may transmit the sequence of decoy messages to the second security application over the established communication channel. In some aspects, the first security application may transmit the sequence of decoy messages continuously (e.g., at all times since establishment of the communication channel) to the second security application. In some aspects, the first security application may transmit the sequence of decoy messages periodically after establishment of the communication channel. In some aspects, the first security application may determine and transmit the sequence of decoy messages at a time associated with a transmission time for transmitting the content message to the second security application. In an example, the first security application may transmit the sequence of decoy messages a given amount of time (e.g., 30 minutes, 60 minutes, 120 minutes, etc.) prior to the transmission time.

Based at least in part on receiving the sequence of decoy messages during the first interval of time, the second security application may attempt to decrypt the sequence of decoy messages utilizing the first symmetric cryptographic key and/or a first decryption algorithm associated with the first encryption algorithm. In some aspects, the second security application may fail to decrypt the sequence of decoy messages by utilizing the first symmetric cryptographic key and/or the first decryption algorithm because, as discussed previously, the plurality of encrypted decoy messages may be encrypted using one or more random encryption keys and/or one or more random encryption algorithms. In this case, the second security application may determine that the received messages are decoy messages that are to be discarded.

As shown by reference numeral 240, the first security application may determine one or more encrypted content messages to be transmitted to the second security application during the first interval of time. In some aspects, the first security application may receive content data to be transmitted to the second security application from an operating system and/or another application (e.g., a web browser, an email client, a messaging client, etc.) associated with the first user device. In some aspects, the first security application may divide the transmission data. In an example, when the first security application determines that an amount of the content data satisfies a threshold amount of data (e.g., amount of the content data is equal to or greater than the threshold amount of data), the first security application may divide the amount of content data to be included within a plurality of content messages. Further, the first security application may encrypt the one or more content messages utilizing the first symmetric cryptographic key and/or the first security algorithm.

Based at least in part on determining the one or more encrypted content messages, as shown by reference numeral 250, the first security application may interleave the one or more encrypted content messages within the sequence of decoy messages. In this case, during the first interval of time, the first security application may transmit, and the second security application may receive, the sequence of decoy messages including a combination of messages. Such combination of messages may include the plurality of encrypted decoy messages and the interleaved one or more encrypted content messages.

In some aspects, the first security application may interleave the one or more encrypted content messages based at least in part on transmitting a first encrypted content message at the transmission time and transmitting a second encrypted content message after a predetermined gap of time after the transmission time. In some aspects, the first security application may interleave the one or more encrypted content messages based at least in part on transmitting the first encrypted content message at the transmission time and transmitting the second encrypted content message after a random gap of time after the transmission time. In some aspects, the first security application may interleave the one or more encrypted content messages based at least in part on transmitting the first encrypted content message at the transmission time and transmitting the second encrypted content message after a predetermined number of encrypted decoy messages. In some aspects, the first security application may interleave the one or more encrypted content messages based at least in part on transmitting the first encrypted content message at the transmission time and transmitting the second encrypted content message after a random number of encrypted decoy messages.

As shown by reference numeral 260, the second security application may receive and decrypt the one or more encrypted content messages. For instance, the second security application may receive the sequence of decoy messages including the combination of messages, including the plurality of encrypted decoy messages and the interleaved one or more encrypted content messages. Based at least in part on receiving the combination of messages during the first interval of time, the second security application may attempt to decrypt the combination of messages utilizing the first symmetric cryptographic key and/or the first security algorithm. The second security application may fail to decrypt the plurality of encrypted decoy messages by utilizing the first symmetric cryptographic key and/or the first security algorithm. In this case, the second security application may determine that such messages are decoy messages that are to be discarded. Alternatively, the second security application may successfully decrypt the one or more encrypted content messages by utilizing the first symmetric cryptographic key and/or the first security algorithm. In this case, the second security application may determine that such messages are content messages. As a result, the second security application may process the decrypted one or more content messages by, for example, forwarding the decrypted one or more content messages to an operating system and/or a third party application associated with the second user device.

As shown by reference numeral 270, the first security application and/or the second security application may update cryptographic keys and/or security algorithms associated with encrypting and/or decrypting the one or more content messages. In an example, at the end of the first interval of time, when the second interval of time begins, the first security application and/or the second security application may discard the first cryptographic key and/or the first security algorithm utilized to encrypt and/or decrypt the one or more content messages during the first interval of time. Further, for utilization during the second interval of time, the first security application and/or the second security application may determine and utilize the second symmetric cryptographic key and/or the second security algorithm to encrypt and/or decrypt the one or more content messages communicated during the second interval of time. Similarly, at an end of the second interval of time, when a third interval of time begins, the first security application and/or the second security application may discard the second cryptographic key and/or the second security algorithm utilized to encrypt and/or decrypt the one or more content messages during the second interval of time. For utilization during the third interval of time, the first security application and/or the second security application may determine and utilize a third symmetric cryptographic key and/or a third security algorithm to encrypt and/or decrypt the one or more content messages communicated during the third interval of time, and so on.

In some aspects, when the second user device is to transmit a content message to the first user device, the second user device (e.g. the second security application) may perform processes associated with, for example, blocks 220 through 270, as discussed above as being performed by the first user device. Also, the first user device (e.g., the first security application) may perform processes associated with, for example, blocks 220 through 270 as discussed above as being performed by the second user device.

In this way, by determining a sequence of decoy messages, determining one or more content messages, and interleaving the one or more content messages within the sequence of decoy messages, as discussed herein, the security device and/or the security applications may assist in avoiding interception and/or decryption of the one or more content messages by a malicious party, even when the malicious party may utilize sophisticated decryption techniques utilizing highly-developed computers. As a result, the security device and/or the security applications may assist in avoiding the malicious party connecting with and/or gaining unauthorized access to the user devices. Consequently, the security device and/or the security applications may assist in avoiding disruption and/or damage to operation of the user devices and other hindrances. Additionally, the security device and/or the security applications may enable efficient utilization of user device resources (e.g., processing resources, memory resources, power consumption resources, battery life, or the like) and network resources (e.g., management resources, bandwidth resources, memory usage resources, processing resources, or the like) for suitable tasks.

As indicated above, FIG. 2 is provided as an example. Other examples may differ from what is described with regard to FIG. 2.

FIG. 3 is an illustration of an example process 300 associated with enhancing network security, according to various aspects of the present disclosure. In some aspects, the process 300 may be performed by a memory and/or a processor/controller (e.g., processing unit 116, processor 720) associated with a user device (e.g., user device 102). As shown by reference numeral 310, process 300 may include determining, by a transmitting device in communication with a receiving device, encrypted decoy messages based at least in part on encrypting decoy data utilizing an encryption key. For instance, the user device may determine, while in communication with a receiving device, encrypted decoy messages based at least in part on encrypting decoy data utilizing an encryption key, as discussed elsewhere herein.

As shown by reference numeral 320, process 300 may include determining, by the transmitting device, one or more encrypted content messages based at least in part on encrypting content data utilizing a cryptographic key, different from the encryption key. For instance, the user device may utilize the associated memory and/or processor to determine one or more encrypted content messages based at least in part on encrypting content data utilizing a cryptographic key, different from the encryption key, as discussed elsewhere herein.

As shown by reference numeral 330, process 300 may include transmitting, by the transmitting device to the receiving device, the one or more encrypted content messages among the encrypted decoy messages. For instance, the user device may utilize an associated communication interface (e.g., communication interface 770) with the associated memory and/or processor to transmit, to the receiving device, the one or more encrypted content messages among the encrypted decoy messages, as discussed elsewhere herein.

Process 300 may include additional aspects, such as any single aspect or any combination of aspects described below and/or in connection with one or more other processes described elsewhere herein.

In a first aspect, in process 300, determining the encrypted decoy messages includes determining the decoy data that corresponds to the content data.

In a second aspect, alone or in combination with the first aspect, in process 300, determining the one or more encrypted content messages includes dividing the content data based at least in part on determining that an amount of content data satisfies a threshold amount.

In a third aspect, alone or in combination with the first through second aspects, in process 300, determining the one or more encrypted content messages includes encrypting the one or more content messages utilizing the cryptographic key during a first interval of time and encrypting the one or more content messages utilizing a new cryptographic key during a second interval of time.

In a fourth aspect, alone or in combination with the first through third aspects, in process 300, transmitting the one or more encrypted content messages among the encrypted decoy messages includes transmitting the one or more encrypted content messages among the encrypted decoy messages over a one-way communication channel.

In a fifth aspect, alone or in combination with the first through fourth aspects, in process 300, transmitting the one or more encrypted content messages among the encrypted decoy messages includes transmitting a first encrypted content message and transmitting a second encrypted content message after a predetermined gap of time after transmitting the first encrypted content message.

In a sixth aspect, alone or in combination with the first through fifth aspects, in process 300, transmitting the one or more encrypted content messages among the encrypted decoy messages includes transmitting a first encrypted content message and transmitting a second encrypted content message after a given number (e.g., predetermined number, random number, etc.) of encrypted decoy messages after transmitting the first encrypted content message.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with enhancing network security, according to various aspects of the present disclosure. In some aspects, the process 400 may be performed by a memory and/or a processor/controller (e.g., processing unit 116, processor 720) associated with a receiving device (e.g., user device 102). As shown by reference numeral 410, process 400 may include receiving, by a receiving device from a transmitting device, a combination of messages including encrypted decoy messages and one or more encrypted content messages, the encrypted decoy messages being determined based at least in part on encrypting decoy data and the one or more encrypted content messages being determined based at least in part on encrypting content data. For instance, the receiving device may receive, from a transmitting device, a combination of messages including encrypted decoy messages and one or more encrypted content messages, the encrypted decoy messages being determined based at least in part on encrypting decoy data and the one or more encrypted content messages being determined based at least in part on encrypting content data, as discussed elsewhere herein.

As shown by reference numeral 420, process 400 may include decrypting, by the receiving device, a received message included in the combination of messages based at least in part on utilizing a cryptographic key. For instance, the receiving device may utilize the associated memory and/or processor to decrypt a received message included in the combination of messages based at least in part on utilizing a cryptographic key, as discussed elsewhere herein.

As shown by reference numeral 430, process 400 may include determining, by the receiving device, that the received message is a content message or that the received message is a decoy message based at least in part on a result of decrypting the received message. For instance, the receiving device may utilize the associated memory and/or processor to determine that the received message is a content message or that the received message is a decoy message based at least in part on a result of decrypting the received message, as discussed elsewhere herein.

Process 400 may include additional aspects, such as any single aspect or any combination of aspects described below and/or in connection with one or more other processes described elsewhere herein.

In a first aspect, in process 400, receiving the combination of messages includes receiving the combination of messages over a one-way channel between the transmitting device and the receiving device.

In a second aspect, alone or in combination with the first aspect, in process 400, determining that the received message is a content message includes determining that the result indicates that the cryptographic key has successfully decrypted the received message.

In a third aspect, alone or in combination with the first through second aspects, in process 400, determining that the received message is a decoy message includes determining that the result indicates that the cryptographic key has failed to decrypt the received message.

In a fourth aspect, alone or in combination with the first through third aspects, process 400 may include utilizing a new cryptographic key to decrypt the received message based at least in part on determining an expiration of a current time of interval.

In a fifth aspect, alone or in combination with the first through fourth aspects, process 400 may include processing the received message based at least in part on determining that the received message is a content message.

In a sixth aspect, alone or in combination with the first through fifth aspects, process 400 may include discarding the received message based at least in part on determining that the received message is a decoy message.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with enhancing network security, according to various aspects of the present disclosure. In some aspects, the process 500 may be performed by a memory and/or a processor/controller (e.g., processing unit 116, processor 720) associated with a transmitting device and/or a receiving device (e.g., user device 102). As shown by reference numeral 510, process 500 may include transmitting, by a transmitting device to a receiving device, a combination of messages including encrypted decoy messages and one or more encrypted content messages. For instance, the transmitting device may utilize an associated communication interface (e.g., communication interface 770) with the memory and/or processor to transmit, to a receiving device, a combination of messages including encrypted decoy messages and one or more encrypted content messages, as discussed elsewhere herein.

As shown by reference numeral 520, process 500 may include determining, by the receiving device, a cryptographic decryption key based at least in part on unique seed information associated with the transmitting device and the receiving device. For instance, the receiving device may utilize the associated memory and/or processor to determine a cryptographic decryption key based at least in part on unique seed information associated with the transmitting device and the receiving device, as discussed elsewhere herein.

As shown by reference numeral 530, process 500 may include determining, by the receiving device, that a message, included in the combination of messages, is a content message or that the message is a decoy message based at least in part on decrypting the message by utilizing the cryptographic decryption key. For instance, the receiving device may utilize the associated memory and/or processor to determine that a message, included in the combination of messages, is a content message or that the message is a decoy message based at least in part on decrypting the message by utilizing the cryptographic decryption key, as discussed elsewhere herein.

Process 500 may include additional aspects, such as any single aspect or any combination of aspects described below and/or in connection with one or more other processes described elsewhere herein.

In a first aspect, process 500 may include interleaving, by the transmitting device, the one or more encrypted content messages among the encrypted decoy messages to determine the combination of messages.

In a second aspect, alone or in combination with the first aspect, process 500 may include communicating, by the transmitting device and the receiving device, to establish a communication channel between the transmitting device and the receiving device for communication of the combination of messages.

In a third aspect, alone or in combination with the first through second aspects, process 500 may include determining, by the transmitting device, decoy data to be included in the decoy messages, the decoy data corresponding to content data to be included in the one or more content messages.

In a fourth aspect, alone or in combination with the first through third aspects, in process 500, transmitting the combination of messages includes transmitting the combination of messages during a first interval of time, and determining the cryptographic decryption key includes determining the cryptographic decryption key for decrypting the combination of messages during the first interval of time.

In a fifth aspect, alone or in combination with the first through fourth aspects, in process 500, determining that the message is a content message includes determining that the cryptographic decryption key can successfully decrypt the message.

In a sixth aspect, alone or in combination with the first through fifth aspects, in process 500, determining that the message is a decoy message includes determining that the cryptographic decryption key cannot successfully decrypt the message.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with enhancing network security, according to various aspects of the present disclosure. In some aspects, the process 600 may be performed by a memory and/or a processor/controller (e.g., processing unit 110, processor 720) associated with a security device included in a CSP control infrastructure (e.g., CSP control infrastructure 104). As shown by reference numeral 610, process 600 may include configuring, by an infrastructure device, a transmitting device to determine an encryption key that is determined based at least in part on seed information associated with the transmitting device and a receiving device, and to encrypt one or more content messages to be transmitted during a first time interval by utilizing the encryption key. For instance, an infrastructure device may utilize the associated memory and/or processor to configure a transmitting device to determine an encryption key that is determined based at least in part on seed information associated with the transmitting device and a receiving device, and to encrypt one or more content messages to be transmitted during a first time interval by utilizing the encryption key, as discussed elsewhere herein.

As shown by reference numeral 620, process 600 may configuring, by the infrastructure device, the receiving device to determine a decryption key that is determined based at least in part on the seed information associated with the transmitting device and the receiving device, and to decrypt one or more encrypted content messages received during the first time interval by utilizing the decryption key. For instance, the infrastructure device may utilize the associated memory and/or processor to configure the receiving device to determine a decryption key that is determined based at least in part on the seed information associated with the transmitting device and the receiving device, and to decrypt one or more encrypted content messages received during the first time interval by utilizing the decryption key, as discussed elsewhere herein.

Process 600 may include additional aspects, such as any single aspect or any combination of aspects described below and/or in connection with one or more other processes described elsewhere herein.

In a first aspect, process 600 may include configuring the transmitting device to determine an encryption algorithm to be utilized with the encryption key for encrypting the one or more content messages, and configuring the receiving device to determine a decryption algorithm to be utilized with the decryption key for decrypting the one or more encrypted content messages, the decryption algorithm being associated with the encryption algorithm.

In a second aspect, alone or in combination with the first aspect, process 600 may include configuring the transmitting device to interleave the one or more encrypted content messages among encrypted decoy messages.

In a third aspect, alone or in combination with the first through second aspects, process 600 may include configuring the transmitting device to interleave the one or more encrypted content messages among encrypted decoy messages.

In a fourth aspect, alone or in combination with the first through third aspects, process 600 may include configuring the transmitting device and the receiving device to determine an expiration time associated with an expiration of the first time interval.

In a fifth aspect, alone or in combination with the first through fourth aspects, process 600 may include configuring the transmitting device to retrieve, from a memory, decoy data that corresponds with content data included in the one or more content messages.

In a sixth aspect, alone or in combination with the first through fifth aspects, process 600 may include configuring the transmitting device and the receiving device to determine a duration of time associated with the first time interval based at least in part on a level of sensitivity associated with content data included in the one or more content messages.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with enhancing network security, according to various aspects of the present disclosure. In some aspects, the example devices 700 may form part of or implement the systems, servers, environments, infrastructures, components, devices, or the like described elsewhere herein (e.g., CSP control infrastructure, VPN server, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   configuring, by an infrastructure device, a transmitting device to determine an encryption key that is determined based at least in part on seed information that identifies the transmitting device and a receiving device, and to encrypt one or more content messages to be transmitted during a first time interval by utilizing the encryption key;
   configuring the transmitting device to interleave the one or more encrypted content messages among encrypted decoy messages, the encrypted decoy messages being determined based at least in part on encrypting a first random number of decoy messages utilizing a first decoy encryption key and a first decoy encryption algorithm, and encrypting a second random number of decoy messages utilizing a second decoy encryption key and a second decoy encryption algorithm, the second decoy encryption key being different from the first decoy encryption key; and
   configuring, by the infrastructure device, the receiving device to determine a decryption key that is determined based at least in part on the seed information that identifies the transmitting device and the receiving device, and to decrypt one or more encrypted content messages received during the first time interval by utilizing the decryption key.

2. The method of claim 1, further comprising:
   configuring the transmitting device to determine an encryption algorithm to be utilized with the encryption key for encrypting the one or more content messages, and
   configuring the receiving device to determine a decryption algorithm to be utilized with the decryption key for decrypting the one or more encrypted content messages, the decryption algorithm being associated with the encryption algorithm.

3. The method of claim 1, further comprising:
   configuring the transmitting device to determine a new encryption key for encrypting one or more content messages to be transmitted during a second time interval, and
   configuring the receiving device to determine a new decryption key for decrypting one or more encrypted content messages received during the second time interval.

4. The method of claim 1, further comprising:
   configuring the transmitting device to determine the encrypted decoy messages based at least in part on encrypting a first encrypted decoy message utilizing the first encryption key and the first encryption algorithm, and encrypting a second decoy message utilizing the second encryption key and the second encryption algorithm.

5. The method of claim 1, further comprising:
   configuring the transmitting device and the receiving device to determine an expiration time associated with an expiration of the first time interval.

6. The method of claim 1, further comprising:
configuring the transmitting device to retrieve, from a memory, decoy data that corresponds with content data included in the one or more content messages.

7. The method of claim 1, further comprising:
configuring the transmitting device and the receiving device to determine a duration of time associated with the first time interval based at least in part on a level of sensitivity associated with content data included in the one or more content messages.

8. An infrastructure device, comprising:
a memory; and
a processor communicatively coupled to the memory, the memory and the processor being configured to:
configure a transmitting device to determine an encryption key that is determined based at least in part on seed information that identifies the transmitting device and a receiving device, and to encrypt one or more content messages to be transmitted during a first time interval by utilizing the encryption key;
configure the transmitting device to interleave the one or more encrypted content messages among encrypted decoy messages, the encrypted decoy messages being determined based at least in part on encrypting a first random number of decoy messages utilizing a first decoy encryption key and a first decoy encryption algorithm, and encrypting a second random number of decoy messages utilizing a second decoy encryption key and a second decoy encryption algorithm, the second decoy encryption key being different from the first decoy encryption key; and
configure the receiving device to determine a decryption key that is determined based at least in part on the seed information that identifies the transmitting device and the receiving device, and to decrypt one or more encrypted content messages received during the first time interval by utilizing the decryption key.

9. The infrastructure device of claim 8, wherein the memory and the processor are configured to:
configure the transmitting device to determine an encryption algorithm to be utilized with the encryption key for encrypting the one or more content messages, and
configure the receiving device to determine a decryption algorithm to be utilized with the decryption key for decrypting the one or more encrypted content messages, the decryption algorithm being associated with the encryption algorithm.

10. The infrastructure device of claim 8, wherein the memory and the processor are configured to:
configure the transmitting device to determine a new encryption key for encrypting one or more content messages to be transmitted during a second time interval, and
configure the receiving device to determine a new decryption key for decrypting one or more encrypted content messages received during the second time interval.

11. The infrastructure device of claim 8, wherein, to configure the transmitting device to determine the encrypted decoy messages, the memory and the processor are configured to:
configure the transmitting device to determine the encrypted decoy messages based at least in part on encrypting a first encrypted decoy message utilizing the first encryption key and the first encryption algorithm, and encrypting a second decoy message utilizing the second encryption key and the second encryption algorithm.

12. The infrastructure device of claim 8, wherein the memory and the processor are configured to:
configure the transmitting device and the receiving device to determine an expiration time associated with an expiration of the first time interval.

13. The infrastructure device of claim 8, wherein the memory and the processor are configured to:
configure the transmitting device to retrieve, from a memory, decoy data that corresponds with content data included in the one or more content messages.

14. The infrastructure device of claim 8, wherein the memory and the processor are configured to:
configure the transmitting device and the receiving device to determine a duration of time associated with the first time interval based at least in part on a level of sensitivity associated with content data included in the one or more content messages.

15. A non-transitory computer-readable medium configured to store instructions, which when executed by a processor associated with an infrastructure device, cause the processor to:
configure a transmitting device to determine an encryption key that is determined based at least in part on seed information that identifies the transmitting device and a receiving device, and to encrypt one or more content messages to be transmitted during a first time interval by utilizing the encryption key;
configure the transmitting device to interleave the one or more encrypted content messages among encrypted decoy messages, the encrypted decoy messages being determined based at least in part on encrypting a first random number of decoy messages utilizing a first decoy encryption key and a first decoy encryption algorithm, and encrypting a second random number of decoy messages utilizing a second decoy encryption key and a second decoy encryption algorithm, the second decoy encryption key being different from the first decoy encryption key; and
configure the receiving device to determine a decryption key that is determined based at least in part on the seed information that identifies the transmitting device and the receiving device, and to decrypt one or more encrypted content messages received during the first time interval by utilizing the decryption key.

16. The non-transitory computer-readable medium of claim 15, wherein the processor is configured to:
configure the transmitting device to determine an encryption algorithm to be utilized with the encryption key for encrypting the one or more content messages, and
configure the receiving device to determine a decryption algorithm to be utilized with the decryption key for decrypting the one or more encrypted content messages, the decryption algorithm being associated with the encryption algorithm.

17. The non-transitory computer-readable medium of claim 15, wherein the processor is configured to:
configure the transmitting device to determine a new encryption key for encrypting one or more content messages to be transmitted during a second time interval, and
configure the receiving device to determine a new decryption key for decrypting one or more encrypted content messages received during the second time interval.

18. The non-transitory computer-readable medium of claim 15, wherein, to configure the transmitting device to determine the encrypted decoy messages, the processor is configured to:

configure the transmitting device to determine the encrypted decoy messages based at least in part on encrypting a first encrypted decoy message utilizing the first encryption key and the first encryption algorithm, and encrypting a second decoy message utilizing the second encryption key and the second encryption algorithm.

19. The non-transitory computer-readable medium of claim 15, wherein the processor is configured to:

configure the transmitting device and the receiving device to determine an expiration time associated with an expiration of the first time interval.

20. The non-transitory computer-readable medium of claim 15, wherein the processor is configured to:

configure the transmitting device to retrieve, from a memory, decoy data that corresponds with content data included in the one or more content messages.

* * * * *